(12) United States Patent
Gollier

(10) Patent No.: US 7,729,394 B2
(45) Date of Patent: Jun. 1, 2010

(54) CONVERSION EFFICIENCY EXPANSION IN WAVELENGTH CONVERTING OPTICAL PACKAGES

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 137 days.

(21) Appl. No.: 11/880,231

(22) Filed: Jul. 20, 2007

(65) Prior Publication Data

US 2009/0022182 A1 Jan. 22, 2009

(51) Int. Cl.
*H01S 3/10* (2006.01)
(52) U.S. Cl. .......................................... 372/21; 372/22
(58) Field of Classification Search ................... 372/21, 372/22
See application file for complete search history.

(56) References Cited

U.S. PATENT DOCUMENTS

| | | | |
|---|---|---|---|
| 5,644,584 | A | 7/1997 | Nam et al. |
| 6,726,763 | B2 | 4/2004 | Lee et al. .......................... 117/2 |
| 2004/0086012 | A1* | 5/2004 | Kitaoka et al. ................ 372/43 |
| 2005/0226304 | A1* | 10/2005 | Schwarz et al. ............... 372/98 |
| 2006/0209912 | A1* | 9/2006 | Luo et al. ...................... 372/21 |
| 2007/0053388 | A1 | 3/2007 | Mizuuchi |

OTHER PUBLICATIONS

Hong Ky Nguyen et al.; "107-mW low-noise green-light emission by frequency doubling of a reliable 1060-nm DFB semiconductor laser diode"; IEEE Photonics Technology Letters, vol. 18, No. 5, Mar. 2006, pp. 682-684.

* cited by examiner

*Primary Examiner*—Minsun Harvey
*Assistant Examiner*—Joshua King
(74) *Attorney, Agent, or Firm*—Kwadjo Adusei-Poku

(57) ABSTRACT

Particular embodiments of the present invention relate generally to altering the effective conversion efficiency curve of an optical package employing a semiconductor laser and an SHG crystal or other type of wavelength conversion device. For example, according to one embodiment of the present invention, a method of controlling an optical package is provided where the optical package is tuned such that ascending portions of a transmission curve representing a spectral filter are aligned with descending portions of a conversion efficiency curve representing a wavelength conversion device. With the filter and wavelength conversion device so aligned, the optical package is further tuned such that the wavelength of the fundamental laser signal lies within a wavelength range corresponding to aligned portions of the ascending and descending portions of the transmission and conversion efficiency curves. Additional embodiments are disclosed and claimed.

21 Claims, 2 Drawing Sheets

CONVERSION EFFICIENCY EXPANSION IN WAVELENGTH CONVERTING OPTICAL PACKAGES

BACKGROUND OF THE INVENTION

The present invention relates generally to semiconductor lasers, laser controllers, laser projection systems, and other optical systems incorporating semiconductor lasers. More particularly, the present invention relates to conversion efficiency expansion in optical packages where a semiconductor laser is coupled to a wavelength conversion device.

SUMMARY OF THE INVENTION

Semiconductor lasers may be configured in a variety of ways. For example and by way of illustration, not limitation, short wavelength sources can be configured for high-speed modulation by combining a single-wavelength semiconductor laser, such as a distributed feedback (DFB) laser, a distributed Bragg reflector (DBR) laser, or a Fabry-Perot laser with a light wavelength conversion device, such as a second harmonic generation (SHG) crystal. The SHG crystal can be configured to generate higher harmonic waves of the fundamental laser signal by tuning, for example, a 1060 nm DBR or DFB laser to the spectral center of the SHG crystal, which converts the wavelength to 530 nm.

The wavelength conversion efficiency of an SHG crystal, such as MgO-doped periodically poled lithium niobate (PPLN), is strongly dependent on the wavelength matching between the laser diode and the SHG device. As will be appreciated by those familiar with laser design, DFB lasers are resonant-cavity lasers using grids or similar structures etched into the semiconductor material as a reflective medium. DBR lasers are lasers in which the etched grating is physically separated from the electronic pumping area of the semiconductor laser. SHG crystals use second harmonic generation properties of non-linear crystals to frequency double laser radiation.

The conversion bandwidths of SHG crystals and other types of wavlength conversion devices are often very narrow. For example, a typical PPLN SHG wavelength conversion device can have a full width half maximum (FWHM) wavelength conversion bandwidth that is only in the 0.16 to 0.2 nm range. Mode hopping and uncontrolled large wavelength variations within the laser cavity can cause the output wavelength of a semiconductor laser to move outside of this allowable bandwidth during operation. Once the semiconductor laser wavelength deviates outside the wavelength conversion bandwidth of the PPLN SHG device, the output power of the conversion device at the target wavelength drops drastically. In laser projection systems, for example, these drops in output power are particularly problematic because they can generate instantaneous changes that will be readily visible as defects at specific locations in the image. These visible defects typically manifest themselves as organized, patterned image defects across the image because the generated image is simply the signature of the temperature evolution of the different sections of the laser.

Generally, when the gain current of a semiconductor laser increases, the temperature of the gain section also increases. As a consequence, the cavity modes move towards higher wavelengths. The wavelength of the cavity modes move faster than the wavelength of the DBR section. So, the laser reaches a point where a cavity mode of lower wavelength is closer to the maximum of the DBR reflectivity curve. At that point, the mode of lower wavelength has lower loss than the mode that is established and, according to basic principles of laser physics, the laser then automatically jumps to the mode that has lower loss. Typically, the emission wavelength slowly increases and includes sudden mode hops whose amplitude is equal to one free spectral range of the laser cavity.

In many applications, it is often necessary to modulate the output intensity of optical packages incorporating semiconductor lasers. When a semiconductor laser is modulated to produce data, the thermal load varies constantly. The resulting change in laser temperature and lasing wavelength generates a variation of the efficiency of the SHG crystal. The present inventor has recognized advantages associated with altering the effective conversion efficiency curve of an optical package employing an SHG crystal or other type of wavelength conversion device. For example, according to one embodiment of the present invention, a method of controlling an optical package is provided where the optical package is tuned such that ascending portions of a transmission curve representing a spectral filter are aligned with descending portions of a conversion efficiency curve representing a wavelength conversion device. With the filter and wavelength conversion device so aligned, the optical package is further tuned such that the wavelength of the fundamental laser signal lies within a wavelength range corresponding to aligned portions of the ascending and descending portions of the transmission and conversion efficiency curves.

According to another embodiment of the present invention, a method of controlling an optical package is provided where the optical package is tuned such that a transmission depression from a superior transmission curve representing the spectral filter is aligned with a conversion efficiency peak from an inferior conversion efficiency curve representing the wavelength conversion device. Within this frame of reference, the wavelength of the fundamental laser signal is tuned such that it lies within a range corresponding to the conversion efficiency peak of the inferior conversion efficiency curve.

Additional embodiments of the present invention relate to optical packages and laser projection systems configured to operate according to the concepts of the various embodiments of the present invention. Although the concepts of the present invention are described primarily in the context of image forming, it is contemplated that various concepts of the present invention may also be applicable to any laser application where repeatable, low-frequency fluctuation of the wavelength of the fundamental laser signal could be a problem.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
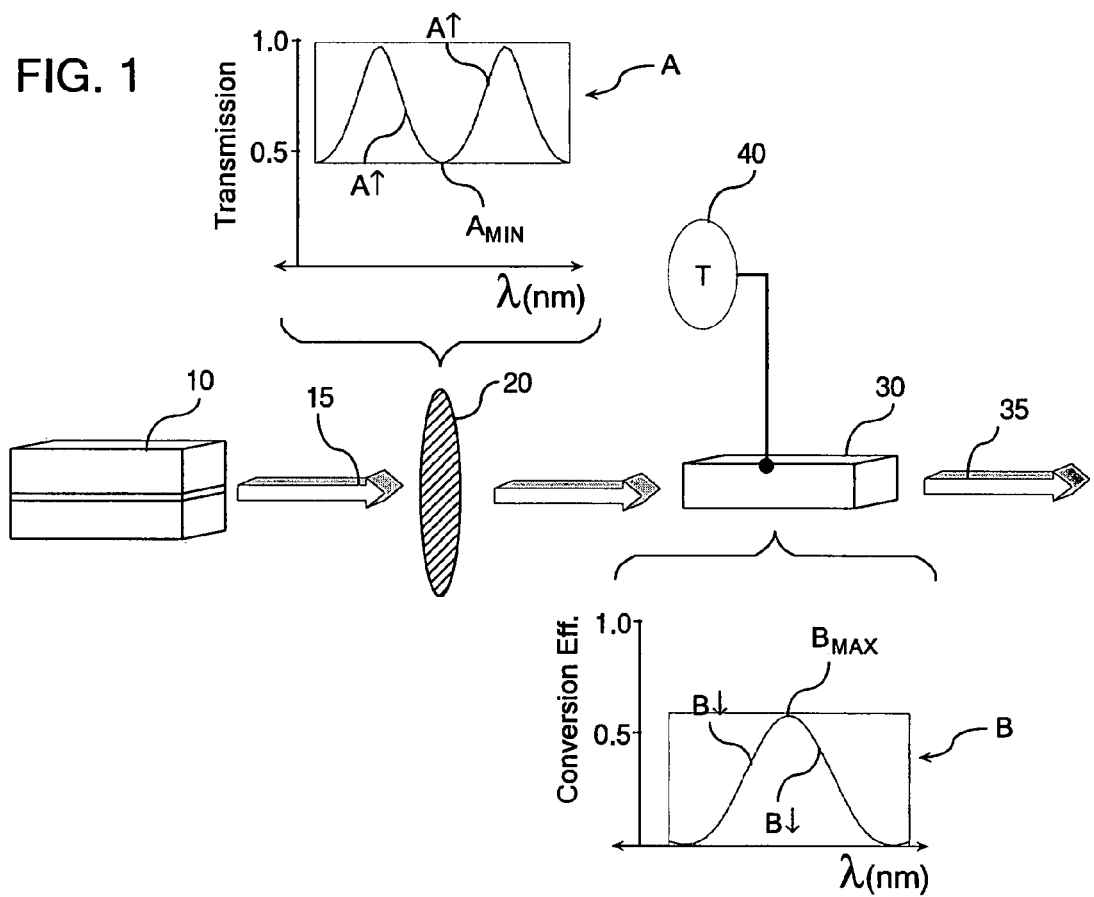
FIG. 1 is a schematic illustration of an optical package according to one embodiment of the present invention.
Figure 2:
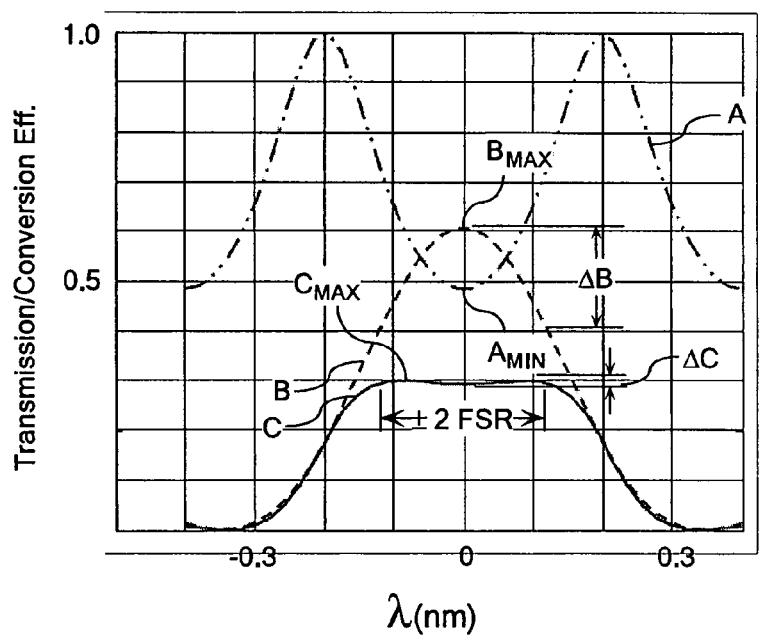
FIGS. 2 and 3 are illustrations of the manner in which respective transmission and conversion efficiency curves according to particular embodiments of the present invention can be aligned.
Figure 3:
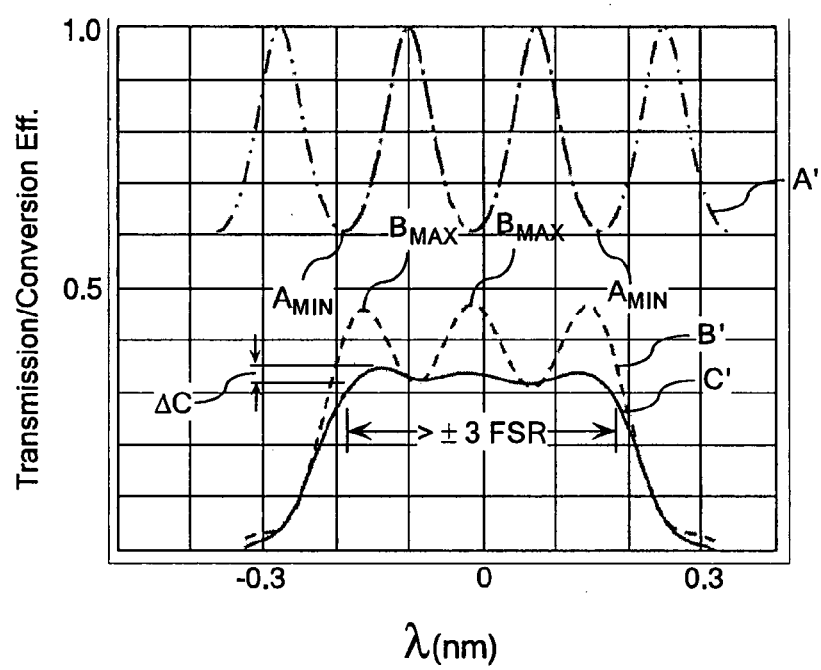

Referring initially to FIGS. 1-3, concepts of particular embodiments of the present invention may be conveniently illustrated with general reference to an optical package comprising a semiconductor laser 10, a spectral filter 20, and a light wavelength conversion device 30. As is described above with reference to SHG crystals and other types of wavelength conversion devices, the wavelength conversion device 30 converts the incident light into higher harmonic waves and outputs a converted laser signal 35. This type of configuration is particularly useful in generating shorter wavelength laser beams from longer wavelength semiconductor lasers and can be used, for example, as a green visible laser source for laser projection systems.

Although the particular manner in which the intensity of the converted signal 35 is modulated can be gleaned from conventional or yet to be developed teachings in the art, generally the intensity of the converted signal 35 can be modulated by modulating the intensity of the semiconductor laser 10. Alternatively, or additionally, the intensity of the converted signal can be modulated by modulating the wavelength of the semiconductor laser 10 because the wavelength conversion efficiency of the wavelength conversion device 30 is dependent on the wavelength matching between the semiconductor laser 10 and the wavelength conversion device 30.

The present inventor has recognized that in many cases intensity modulation and other operational routines executed in optical packages similar to that illustrated in FIG. 1 can result in significant thermal patterning in the intensity of the converted signal. This thermal patterning is generally a result of temperature variations in the package that result in wavelength drift. In addition, the aforementioned intensity modulation and wavelength tuning can also generate mode hops, particularly where the amplitude of the wavelength modulation is larger than the laser free spectral range of the laser. Although the present invention is not limited to any particular manifestation of the wavelength variations or sudden mode hops, these wavelength fluctuations can create smooth intensity variations and the mode hops can create relatively abrupt intensity shifts in laser projection systems or other types of devices utilizing semiconductor laser sources. The particular pattern created in the image by these defects can be a function of a number of factors including, but not limited to, laser temperature, laser free spectral range, the SHG crystal spectral band pass, the spectral alignment of the laser DBR with respect to the SHG crystal, etc. Regardless of the nature of the defect pattern, the pattern itself can present a problem in the image because it presents a readily recognizable, systematic structure in the image. Also, for quasi static images, these defects typically repeat themselves from frame to frame, making it very easy to recognize the defects in the image.

Having noted these challenges, one of the more complicated problems associated with the use of SHG crystals or other types of wavelength conversion devices in conjunction with semiconductor lasers is the spectral sensitivity of the crystal. Indeed, the conversion efficiency of many SHG crystals is highly dependent on the wavelength of the fundamental laser signal 15 emitted by the laser 10. Although it is possible to make the design of a PPLN more forgiving to wavelength fluctuations, there is typically a significant trade off in conversion efficiency when doing so. As a result, PPLN parameters typically represent some sort of balance between conversion efficiency and power fluctuations. Also, PPLN designs optimized for minimum power fluctuations and maximum conversion efficiency are often difficult to manufacture because of their complex design and because it is often necessary to control crystal poling very accurately in the manufacturing process. Many of these PPLN designs appear to be unacceptably sensitive to thermal gradients. Accordingly, the present inventors have recognized a continuing need to find a way to increase system spectral bandwidth without introducing these types of problems.

One method of controlling an optical package according to the present invention can be illustrated with reference to FIGS. 1 and 2, where an optical package and the respective transmission and conversion efficiency curves of the spectral filter 20, curve A, and the wavelength conversion device 30, curve B, are illustrated. Generally, the semiconductor laser 10 is operated to generate a relatively low frequency fundamental laser signal 15. For example, to generate green laser light at the output of the optical package, the fundamental laser signal will fall within the infrared portion of the wavelength domain.

As is illustrated, the spectral filter 20 and the wavelength conversion device 30 are positioned along a common optical path extending from an output of the semiconductor laser 10. For the purposes of illustrating the concepts of the present invention, the illustrated optical path is not complex. However, it is noted that the fundamental laser signal 15 emitted by the semiconductor laser 10 can be either directly coupled into the spectral filter 20 and the wavelength conversion device 30 or can be coupled through collimating and focusing optics or any other type of suitable optical element or optical system. As is noted above, the wavelength conversion device 30 converts the fundamental laser signal 15 to a relatively high-frequency converted laser signal 35.

Although a variety of spectral filters may be employed in practicing the present invention, it is noted that the transmission curve A of the spectral filter 20 should comprise at least one local transmission minimum $A_{MIN}$ interposed between ascending portions A↑ of the curve A, in the wavelength domain λ(nm). For example, the spectral filter 20 may comprise a Fabry-Perot filter that exhibits a transmission function that varies periodically between respective transmission maxima and minima. Those practicing the present invention will appreciate that the portions A↑ are referred to herein as "ascending" portions because transmission increases as the wavelength values move away from the local transmission minimum $A_{MIN}$. Similarly, the wavelength conversion device 30 can be characterized by a conversion efficiency curve B comprising at least one local conversion maximum $B_{MAX}$ interposed between descending portions B↓ of the curve B in the wavelength domain λ(nm).

In practicing the illustrated embodiment of the present invention, the optical package is tuned such that the ascending portions A↑ of the transmission curve A are at least partially aligned with the descending portions B↓ of the conversion efficiency curve B in the wavelength domain λ(nm). Stated differently, the transmission curve A can be characterized as a superior transmission curve that comprises at least one transmission depression in the wavelength domain at $A_{MIN}$. Similarly, the conversion efficiency curve B can be characterized as an inferior conversion efficiency curve comprising at least one conversion efficiency peak in the wavelength domain at $B_{MAX}$. In these terms, the optical package is tuned such that the conversion efficiency depression $A_{MIN}$ of the superior curve A is at least partially aligned with the conversion efficiency peak $B_{MAX}$ of the inferior curve B.

As a result of the above-noted alignment, light propagating along the optical path will see a resulting composite conversion efficiency curve C that has a lower conversion maximum $C_{MAX}$ than the local conversion maximum $B_{MAX}$ of the wavelength conversion device 30. In addition, the composite conversion efficiency curve C has a dramatically lower conversion efficiency deviation ΔC over a wavelength range that spans about ±2 free spectral ranges (FSR) of the semiconductor laser, i.e., ΔB>>ΔC. Although any operational or design parameters resulting in lower conversion efficiency would typically be discouraged, the present inventor has recognized that lower conversion efficiency can be tolerated in many applications, particularly where a lower conversion efficiency deviation can be achieved over a relatively broad wavelength range, as is illustrated in FIG. 2. Because the optical package exhibits dramatically lower conversion efficiency deviation ΔC over a wavelength range that spans about ±2 free spectral ranges (FSR) of the semiconductor laser, the package can tolerate significant variations in the wavelength of the fundamental laser signal without exhibiting dramatic variations in the intensity of the converted laser signal. It is noted that the particular values, scale, and curve profiles illustrated in FIG. 2 are presented for clarity of illustration and the concepts of the present invention are not limited to the particular values, scale, and profile illustrated in FIG. 2.

In operation, the optical package can also be tuned to ensure that the wavelength of the fundamental laser signal 15 lies within the relatively flat portion of the expanded conversion efficiency profile of the composite conversion efficiency curve C. This profile shape is a direct result of the degree of alignment between the transmission and conversion efficiency curves A, B and the respective shapes of the ascending and descending portions of the transmission and conversion efficiency curves A, B. For example, in the embodiment illustrated in FIG. 3, the ascending portions A↑ of the transmission curve A are aligned with the descending portions B↓ of the conversion efficiency curve B over a range of about 0.4 nm. As a result, the conversion efficiency deviation ΔC of the composite conversion efficiency curve C is well below about ±5% over the ±2 FSR wavelength range, or greater than about 0.2 nm.

An additional embodiment of the present invention is illustrated in FIG. 3 and contemplates expansion of the range over which the conversion efficiency deviation ΔC is below about ±5%. More specifically, in the illustrated embodiment the wavelength conversion device comprises an SHG crystal where the poling period across the crystal is varied or where multiple distinct crystal sections are combined to define at least two wavelength converting components within the wavelength conversion device. Each of the components combined in this manner can be characterized by conversion efficiency curves that are distinct in the wavelength domain of the fundamental laser signal. As a result, the combined conversion efficiency curve B' of this type of wavelength conversion device comprises a plurality of local conversion maxima $B_{MAX}$. Similarly, the transmission curve A' of the spectral filter comprises a plurality of local transmission minima $A_{MIN}$. In this embodiment, the optical package is tuned such that respective ones of the local conversion maxima $B_{MAX}$ of the combined conversion efficiency curve B are at least partially aligned with the respective local transmission minima $A_{MIN}$ of the spectral filter. As a result, the conversion efficiency deviation of the composite conversion efficiency curve C' is below about ±5% over the ±3 FSR wavelength range, or greater than about 0.3 nm. Further detail regarding the design of SHG crystal where the poling period across the crystal is varied or where multiple distinct crystal sections are combined to define at least two wavelength converting components can be gleaned from a variety of sources, including U.S. Pat. No. 6,726,763.

To align the curves A, B in the manner described above, it will often be necessary to tune one or more components of the optical package. For example, in the illustrated embodiment, the optical package is tuned by controlling the temperature of the wavelength conversion device 30 by means of a suitable temperature control mechanism 40 operatively coupled to the wavelength conversion device 30. In addition, it will often be necessary to control the wavelength of the fundamental laser signal 15. As will be appreciated by those familiar with semiconductor laser design, wavelength tuning can be executed in a variety of ways including control of the temperature of one or more regions of the semiconductor laser, current injection into one or more regions of the semiconductor laser, or both.

Although the particular embodiment of the present invention illustrated in FIG. 1 shows a spectral filter 20 positioned between the output of the semiconductor laser 10 and an input face of the wavelength conversion device 30, it is noted that the wavelength conversion device may be positioned between the output of the semiconductor laser 10 and an input face of the spectral filter 20. In practicing this alternative embodiment of the present invention, it will be necessary to align the ascending and descending portions of the respective curves A, B along a common wavelength coordinate axis in the wavelength domain of the relatively high-frequency converted laser signal 35, as opposed to the wavelength domain of the relatively low-frequency fundamental laser signal 15. In addition, care must be taken to ensure that the spectral filter 20 is operable in the wavelength domain of the relatively high-frequency converted laser signal 35.

Similarly, although the particular embodiment of the present invention illustrated in FIG. 1 shows a spectral filter 20 as an optical component distinct from the wavelength conversion device 30, it is contemplated that the spectral filter 20 may be provided as a Bragg grating formed in the wavelength conversion device 30.

Figure 4:
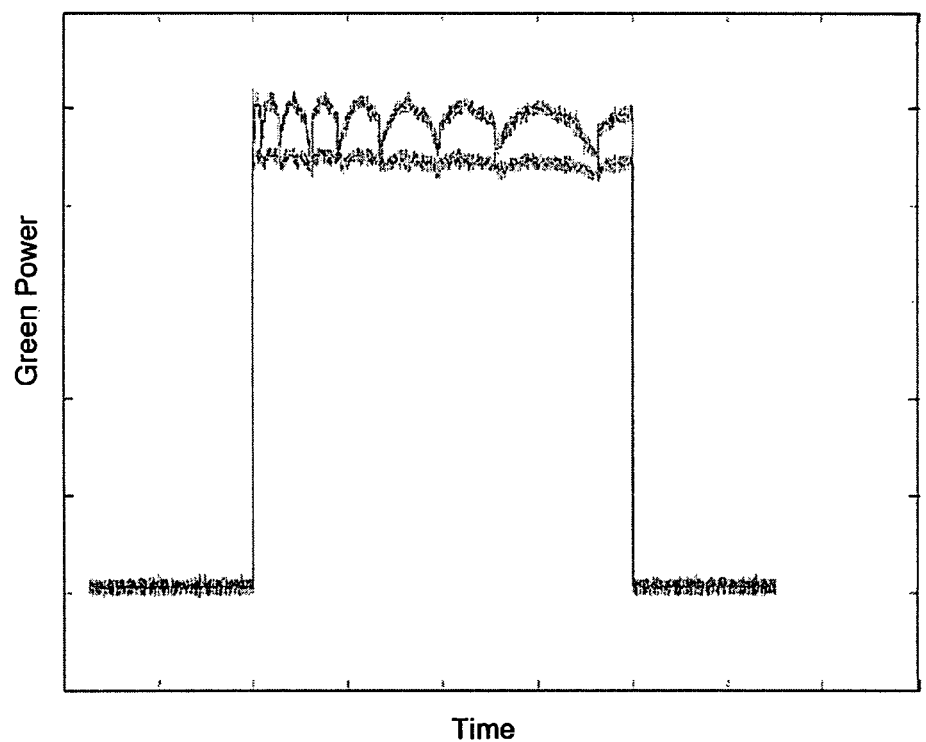
FIG. 4 represents an approximation of expected enhanced intensity stability in a converted laser signal utilizing concepts of particular embodiments of the present invention.

FIG. 4 illustrates the result of an experiment designed to provide an indication of intensity stability in a converted laser signal utilizing concepts of particular embodiments of the present invention. In FIG. 4, the relative intensity of a high frequency converted laser signal in the green portion of the visible spectrum is plotted over time with and without the spectral filter. As is illustrated in FIG. 4, referring to the relatively high intensity portion of the plot, without the spectral filter, the intensity of the converted laser signal varies significantly over time. In contrast, referring to the relatively low intensity portion of the plot, the intensity of the converted laser signal is relatively static.

For the purposes of defining and describing the present invention, particular wavelength spectra are described or recited herein as being either "relatively low-frequency" or "relatively high-frequency." The description and claims should be read with the understanding that such spectra are described and recited herein as simply being "low-frequency" or "high-frequency" relative to each other and not some other value or reference. Further, the description and claims should be read with the understanding that "relatively low-frequency" means a spectrum at a shorter wavelength and "relatively high-frequency" means a spectrum at a longer wavelength.

Although the concepts of the present invention are described primarily in the context of DBR lasers, it is contemplated that the control schemes discussed herein will also have utility in a variety of types of semiconductor lasers, including but not limited to DFB lasers, Fabry-Perot lasers, and many types of external cavity lasers.

It is contemplated that the concepts of the present invention will enjoy applicability in a variety of contexts including, but not limited to, pixel-based projection systems and spatial light modulator based systems (including digital light processing (DLP), transmissive LCD, and liquid crystal on silicon (LCOS).

It is noted that terms like "preferably," "commonly," and "typically," when utilized herein, are not intended to limit the scope of the claimed invention or to imply that certain features are critical, essential, or even important to the structure or function of the claimed invention. Rather, these terms are merely intended to identify particular aspects of an embodiment of the present invention or to emphasize alternative or additional features that may or may not be utilized in a particular embodiment of the present invention.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of controlling an optical package comprising a semiconductor laser, a spectral filter, and a wavelength conversion device, wherein:
    the semiconductor laser is operated to generate a fundamental laser signal comprising a relatively low-frequency spectrum in a wavelength domain;
    the spectral filter and the wavelength conversion device are positioned along a common optical path extending from an output of the semiconductor laser;
    the spectral filter is characterized by a transmission curve comprising at least one local conversion minimum interposed between ascending portions of the curve in the wavelength domain;
    the wavelength conversion device is characterized by a conversion efficiency curve comprising at least one local conversion maximum interposed between descending portions of the curve in the wavelength domain;
    the wavelength conversion device is configured to convert the fundamental laser signal to a converted laser signal comprising a relatively high-frequency wavelength spectrum;
    the optical package is tuned such that the ascending portions of the transmission curve are at least partially aligned with the descending portions of the conversion efficiency curve in the wavelength domain;
    the optical package is further tuned such that the wavelength of the fundamental laser signal lies within a wavelength range corresponding to aligned portions of the ascending and descending portions of the transmission and conversion efficiency curves; and
    the tuning of the optical package reduces an intensity fluctuation of the converted laser signal.

2. A method as claimed in claim 1 wherein the degree of alignment and the respective shapes of the ascending and descending portions of the transmission and conversion efficiency curves are such that a resulting composite conversion efficiency curve has a lower conversion maximum than the local conversion maximum of the wavelength conversion device and a lower conversion efficiency deviation than the conversion efficiency curve over a wavelength range of about ±2 FSR of the semiconductor laser.

3. A method as claimed in claim 2 wherein the conversion efficiency deviation of the composite conversion efficiency curve is within about ±5% over the ±2 FSR wavelength range.

4. A method as claimed in claim 2 wherein the conversion efficiency deviation of the composite conversion efficiency curve is within about ±5% over the ±3 FSR wavelength range.

5. A method as claimed in claim 1 wherein the degree of alignment and the respective shapes of the ascending and descending portions of the transmission and conversion efficiency curves are such that a resulting composite conversion efficiency curve has a lower conversion maximum than the local conversion maximum of the wavelength conversion device and a lower conversion efficiency deviation than the conversion efficiency curve over a wavelength range of greater than about 0.2 nm.

6. A method as claimed in claim 5 wherein the conversion efficiency deviation of the composite conversion efficiency curve is within about ±5% over a wavelength range of greater than about 0.2 nm.

7. A method as claimed in claim 5 wherein the conversion efficiency deviation of the composite conversion efficiency curve is within about ±5% over a wavelength range of greater than about 0.3 nm.

8. A method as claimed in claim 1 wherein the optical package is tuned to align the transmission and conversion efficiency curves by controlling the temperature of the wavelength conversion device.

9. A method as claimed in claim 1 wherein the optical package is tuned to control the wavelength of the fundamental laser signal by controlling the temperature of one or more regions of the semiconductor laser, current injection into one or more regions of the semiconductor laser, or both.

10. A method as claimed in claim 1 wherein the spectral filter is positioned along the common optical path between the output of the semiconductor laser and an input face of the wavelength conversion device.

11. A method as claimed in claim 10 wherein the optical package is tuned such that the ascending portions of the transmission curve are at least partially aligned with the descending portions of the conversion efficiency curve along a common wavelength coordinate axis in the wavelength domain of the relatively low-frequency fundamental laser signal.

12. A method as claimed in claim 1 wherein the wavelength conversion device is positioned along the common optical path between the output of the semiconductor laser and an input face of the spectral filter.

13. A method as claimed in claim 12 wherein the optical package is tuned such that the ascending portions of the transmission curve are at least partially aligned with the descending portions of the conversion efficiency curve along a common wavelength coordinate axis in the wavelength domain of the relatively high-frequency converted laser signal.

14. A method as claimed in claim 1 wherein the spectral filter comprises a Fabry-Perot filter.

15. A method as claimed in claim 1 wherein the spectral filter is provided as a Bragg grating formed in the wavelength conversion device.

16. A method as claimed in claim 1 wherein the spectral filter exhibits a transmission function that varies periodically between respective transmission maxima and minima.

17. A method as claimed in claim 1 wherein the wavelength conversion device comprises a SHG crystal.

18. A method as claimed in claim 1 wherein:
the wavelength conversion device comprises at least two wavelength converting components;
each of the wavelength converting components is characterized by conversion efficiency curves that are distinct in the wavelength domain of the fundamental laser signal;
a combined conversion efficiency curve of each of the wavelength converting components of the wavelength conversion device comprises a plurality of local conversion maxima in the wavelength domain;
the transmission curve of the spectral filter comprises a plurality of local conversion minima; and
the optical package is tuned such that respective ones of the local conversion maxima of the combined conversion efficiency curve of the wavelength converting components are at least partially aligned with the respective local conversion minima of the spectral filter.

19. A method as claimed in claim 1 wherein:
the transmission curve comprises a superior transmission curve comprising at least one conversion efficiency depression in the wavelength domain;
the conversion efficiency curve comprises an inferior conversion efficiency curve comprising at least one conversion efficiency peak in the wavelength domain; and
the optical package is tuned such that the conversion efficiency depression of the superior transmission curve is at least partially aligned with the conversion efficiency peak of the inferior conversion efficiency curve in the wavelength domain.

20. A method of controlling an optical package comprising a semiconductor laser, a spectral filter, and a wavelength conversion device, wherein:
the semiconductor laser is operated to generate a fundamental laser signal comprising a relatively low-frequency wavelength spectrum in a wavelength domain;
the spectral filter and the wavelength conversion device are positioned along a common optical path extending from an output of the semiconductor laser;
the spectral filter is characterized by a superior transmission curve comprising at least one transmission depression in the wavelength domain;
the wavelength conversion device is characterized by an inferior conversion efficiency curve comprising at least one conversion efficiency peak in the wavelength domain;
the wavelength conversion device is configured to convert the fundamental laser signal to a converted laser signal comprising a relatively high-frequency wavelength spectrum;
the optical package is tuned such that the transmission depression of the superior transmission curve is at least partially aligned with the conversion efficiency peak of the inferior conversion efficiency curve in the wavelength domain;
the optical package is further tuned such that the wavelength of the fundamental laser signal lies within a wavelength range corresponding to the conversion efficiency peak of the inferior conversion efficiency curve; and
the tuning of the optical package reduces an intensity fluctuation of the converted laser signal.

21. An optical package comprising a semiconductor laser, a spectral filter, and a wavelength conversion device, wherein:
the semiconductor laser is configured to generate a fundamental laser signal comprising a relatively low-frequency wavelength spectrum in a wavelength domain;
the spectral filter and the wavelength conversion device are positioned along a common optical path extending from an output of the semiconductor laser;
the spectral filter is characterized by a superior transmission curve comprising at least one transmission depression in the wavelength domain;
the wavelength conversion device is characterized by an inferior conversion efficiency curve comprising at least one conversion efficiency peak in the wavelength domain;
the wavelength conversion device is configured to convert the fundamental laser signal to a convened laser signal comprising a relatively high-frequency wavelength spectrum;
the spectral filter comprises a temperature control mechanism configured to at least partially control the temperature of a portion of the spectral filter in the optical path to affect alignment of the transmission depression of the superior transmission curve relative to the conversion efficiency peak of the inferior conversion efficiency curve in the wavelength domain;
the semiconductor laser comprises a wavelength control mechanism configured to at least partially control the temperature of one or more regions of the semiconductor laser, current injection into one or more regions of the semiconductor laser, or both, to affect the wavelength of the fundamental laser signal relative to the conversion efficiency peak of the inferior conversion efficiency curve; and
the temperature control mechanism and wavelength control mechanism are operable to reduce an intensity fluctuation of the converted laser signal.

* * * * *